United States Patent Office 3,208,848
Patented Sept. 28, 1965

3,208,848
ALUMINA-COBALT-GOLD COMPOSITION
Ralph P. Levey, Jr., Oak Ridge, Tenn., assignor to the United States of America as represented by the United States Atomic Energy Commission
No Drawing. Filed Feb. 25, 1964, Ser. No. 347,318
10 Claims. (Cl. 75—206)

My invention relates to materials containing alumina as the principal constituent and particularly to such materials having a high compressive strength.

Materials which are exceptionally hard and which have a high compressive strength are useful as elements in high pressure, high temperature equipment and as cutting tips for machine tools. Harder, stronger materials than those presently available are desirable.

I have discovered that a composition consisting essentially of 80 to 97 percent alumina and 3 to 20 percent of a mixture of the metals cobalt and gold, wherein the weight of the gold is 3 to 12 percent of the total weight of the metal components, has excellent high pressure-high temperature properties.

Within the range of 95 to 97 percent alumina this composition is unexpectedly hard and has exceptionally high compressive strength. Tool tips made from compositions in this range are able to sustain heavier cuts than the best commercially available oxide or carbide tools, and compressive testing indicates the material is not only stronger, but is more ductile than other oxides used for tools. The weight of gold is preferably about 10 percent of the weight of cobalt, and the preferred composition is about 96.7 percent alumina, 3 percent cobalt, and 0.3 percent gold.

Materials of this composition containing less than about 95 percent alumina are softer than the materials containing 95 to 97 percent alumina, yet have high strength at elevated temperatures, and are useful as structural materials where high temperature strength is needed.

Articles having this composition may be made by first mixing together alumina powder, cobalt powder, and gold powder in the proper ratio. Although alumina powders as large as 30 microns may be used, the alumina powder should be as fine as possible, and the preferred powders have an average particle diameter of 0.05 to 0.5 micron.

While the cobalt and gold powders may have an average particle diameter as great as 30 microns, the preferred powder has an average particle diameter of 1 to 5 microns.

The powders may be mixed by any conventional means which will make a homogeneous mass of the powders without adding impurities.

The mixed powders are then formed into a body. This may be done by merely placing the powder mixture within a mold and pressing it until the powder mass retains the configuration of the mold upon separation therefrom. In the preferred method of forming a body from powders, the formed shape is subjected to a high pressure, at least about 100,000 pounds per square inch and preferably 125,000 to 200,000 pounds per square inch. Although articles made from my composition will have excellent mechanical properties even if the powder mass from which they have been made has not been compressed at these high pressures, it is not possible to achieve the exceptionally high values of compressive strength and hardness desirable for some uses without such a step.

The shaped mass of powder (after pressing if a pressing step is used) is then sintered in a non-oxidizing atmosphere. The sintering temperature is not critical, but a sintering temperature of about 1450° to 1550° C. is preferred. In sintering, the temperature rise must be kept below about 20° C. per hour, and preferably 5° to 10° C. per hour in order to prevent bubble formation.

Having thus described my invention the following examples are given to illustrate it in more detail. Examples I and II show a method of making articles having my preferred composition and give the results of physical tests on these articles; Examples III–VII give the results of comparable tests made on other compositions; and Examples VIII–XII give the results of cutting tests made using commercially available compositions for tool tips.

EXAMPLE I

Alumina powder having an average particle diameter of about 0.05 micron was wet-milled with 5–40 micron cobalt powder and 5–30 micron gold powder in a 1:1 water-alcohol mixture for 150 hours. The volume ratio of powder to liquid was 1:3. The powder mixture contained 96.7 weight percent $Al_2O_3$, 3.0 percent Co and 0.3 percent Au. The ball-mill and the balls were of high density $Al_2O_3$.

The milled powders were vacuum dried at 300° F., the dried powder was tamped into a rubber mold, and the filled mold was evacuated, sealed and immersed in a light mineral oil in a piston-cylinder type pressure vessel. The pressure within the vessel was raised to about 200,000 pounds per square inch and held at that level for one minute. The resulting pressed mixture had about 50 percent voids.

The pressed compact was then sintered in a hydrogen atmosphere. The temperature was raised at 20° C. per hour to a temperature of 1550° C. The compact was held at this temperature for 2 hours.

The resulting sintered compact had a compressive strength of 630,000 pounds per square inch, a Rockwell "A" hardness rating of 92, and a Knoop hardness number of 1205. Its density was 3.44.

EXAMPLE II

The procedure of Example I was followed in forming hemispheres ¾ inch in diameter and solids ¾ x ¾ inch square and ¼ inch thick. The sintered parts were ground to cutting tool tip properties using diamond grinding wheels. A 1/16 inch radius and a 3 to 9 degree negative rake were used on the squares.

Cutting test of these tool tips were carried out on an 18 inch long, six inch diameter bar of high carbon steel (AISI, grade D-3). The bar was turned at 240 revolutions per minute and the tool, cutting just below center, was moved into the cut at 4 inches per minute. The tool bit failed at a depth of 0.120 inch, and this failure was due to cocking and subsequent chattering of the bar in the chuck. The surface exposed by the cut was bright to the point of failure.

As can be seen from the data of Examples I and II my composition has a high compressive strength, is exceptionally hard, and is an excellent material for cutting tool tips.

EXAMPLE III

Alumina powder having an average particle diameter of about 0.05 micron was formed into an article in a conventional manner using a low forming pressure (about 30,000 pounds per square inch). The resulting pressed article was sintered at 1500° C. The compressive strength of the resulting article was about 400,000 pounds per square inch.

As can be seen by comparing the data of Examples I and III, the compressive strength of articles formed from my composition and by my preferred method have a compressive strength greatly in excess of that of pure $Al_2O_3$.

EXAMPLE IV

An article was made from pure alumina powder using the compression as well as the sintering step of Example I. The resulting article had a compressive strength of 571,000 pounds per square inch, which was considerably greater than the pure alumina article of Example III, but considerably less than that of my alumina-cobalt-gold composition. Not only did this alumina article have a lower compression strength than my composition, but it was quite brittle.

EXAMPLE V

The procedure of Example I was followed in forming an article having the composition 95 percent $Al_2O_3$–5 percent cobalt. The resulting article had a compressive strength of 532,000 pounds per square inch, considerably below that of the alumina-cobalt-gold composition; furthermore, the material was softer than my composition, having a Rockwell "A" hardness of 83.

EXAMPLE VI

The procedure of Example I was followed in forming an article having the composition 95 percent $Al_2O_3$, 4 percent cobalt, and 1 percent gold. Compression and cutting tests showed that this material was clearly inferior to the material of Example I.

EXAMPLE VII

The procedure of Example I was followed in forming an article having the composition 99 percent $Al_2O_3$, 0.9 percent cobalt, and 0.1 percent gold. Compression and cutting tests showed that this material was clearly inferior to the material of Example I.

EXAMPLES VIII–XII

Cutting tests of other tool materials were made in the same manner as the tests of my composition in Example II. The materials used and the results, together with the results of Example II, are given in the following table.

Table

| Example No. | Material | Depth of Cut at Failure (inch) |
|---|---|---|
| I | $Al_2O_3$ plus 3% Co—0.3% Au | 0.120 |
| III | $Al_2O_3$ plus 2% $Cr_2O_3$ | 0.040 |
| X | $Al_2O_3$, Hot Pressed (commercial grade) | 0.050 |
| C | $Al_2O_3$, Pure (hi-pressure pressed) | 0.060 |
| XI | WC plus 10% Co | 0.080 |
| XII | $Al_2O_3$ plus 0.5% $Fe_2O_3$ | 0.090 |

This table clearly shows the cutting superiority of tool tips made from my composition.

The above examples are offered to illustrate my invention. Variations in the composition and method of making articles from the alumina-cobalt-gold powders will be apparent to workers in the art, and my invention should be limited only in accordance with the following claims.

Having thus described my invention, I claim:

1. A composition of matter consisting essentially of 80 to 97 percent by weight alumina and 3 to 20 percent by weight of a mixture of the metals cobalt and gold, wherein the weight of the gold is from 3 to 12 percent of the total weight of the metal components.

2. A composition of matter consisting essentially of 95 to 97 percent by weight alumina and 3 to 5 percent by weight of a mixture of the metals cobalt and gold, wherein the weight of the gold is from 3 to 12 percent of the total weight of the metal components.

3. The composition of claim 2 wherein the weight of the gold is about 10 percent of the weight of cobalt.

4. A composition of matter consisting of about 96.7 percent alumina, 3 percent cobalt, and 0.3 percent gold.

5. A composition of matter consisting essentially of 80 to 95 percent by weight alumina and 5 to 20 percent by weight of a mixture of the metals cobalt and gold, wherein the weight of the gold is from 3 to 12 percent of the total weight of the metal components.

6. The composition of claim 5 wherein the weight of the gold is about 10 percent of the weight of cobalt.

7. A method of making an article comprising the steps of:
   (a) mixing together alumina powder, cobalt powder, and gold powder in the amounts of 80 to 97 percent by weight alumina and 3 to 20 percent by weight of a mixture of the metals cobalt and gold wherein the weight of the gold is from 3 to 12 percent of the total weight of the metal components;
   (b) pressing the resulting mixed powders at a pressure of at least about 100,000 pounds per square inch to obtain a formed article;
   (c) sintering the resulting formed article.

8. The method of claim 7 wherein the mixed powders are pressed at a pressure of 125,000 to 200,000 pounds per square inch and the resulting formed article is sintered at 1450° C. to 1550° C.

9. The method of claim 7 wherein the powder mixture consists of 95 to 97 percent by weight alumina and 3 to 5 percent by weight of a mixture of the metals cobalt and gold, wherein the weight of gold is about 10 percent of the weight of cobalt.

10. The method of claim 7 wherein the powder mixture consists of 80 to 95 percent by weight alumina and 5 to 20 percent by weight of cobalt and gold, and the weight of gold is about 10 percent of the weight of the cobalt.

References Cited by the Examiner

UNITED STATES PATENTS 2,961,325  11/60  Mayfield _____ 29—182.5 X

FOREIGN PATENTS 826,392  1/60  Great Britain.

OTHER REFERENCES

Ryshkewitch: Oxide Ceramics, Academic Press, New York, 1960, page 422.

References Cited by the Applicant

American Ceramic Society Bulletin 35, pp. 66–70 (1956), Feb. 15, "An Oxidation Study of Cobalt-Alumina Mixtures."

CARL D. QUARFORTH, *Primary Examiner.*